US012790991B2

(12) United States Patent
Yamaguchi et al.

(10) Patent No.: US 12,790,991 B2
(45) Date of Patent: Nov. 10, 2026

(54) CONTROL DEVICE FOR INTERNAL COMBUSTION ENGINE

(71) Applicant: Hitachi Astemo, Ltd., Hitachinaka (JP)

(72) Inventors: Naomichi Yamaguchi, Hitachinaka (JP); Hirotaka Nakai, Hitachinaka (JP); Masashi Nemoto, Hitachinaka (JP); Osamu Mukaihara, Hitachinaka (JP); Yoshikuni Kurashima, Hitachinaka (JP); Takeshi Eto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 19/112,304

(22) PCT Filed: Dec. 16, 2022

(86) PCT No.: PCT/JP2022/046379

§ 371 (c)(1),
(2) Date: Mar. 17, 2025

(87) PCT Pub. No.: WO2024/127634

PCT Pub. Date: Jun. 20, 2024

(65) Prior Publication Data

US 2026/0104017 A1 Apr. 16, 2026

(51) Int. Cl.

*F02D 41/38* (2006.01)
*F02D 1/02* (2006.01)
*F02D 41/14* (2006.01)

(52) U.S. Cl.

CPC .......... *F02D 41/3845* (2013.01); *F02D 1/02* (2013.01); *F02D 41/1402* (2013.01);
(Continued)

(58) Field of Classification Search

CPC .... F02D 41/3845; F02D 1/02; F02D 41/1402; F02D 2041/1412; F02D 2041/389; F02D 2200/0602; F02D 2200/0616
See application file for complete search history.

(56) References Cited

U.S. PATENT DOCUMENTS 8,079,345 B2 * 12/2011 Okamoto ............ F02D 41/3845
123/456

FOREIGN PATENT DOCUMENTS

CN 109915270 B * 11/2021 ......... F02D 41/3845
JP 2007-32321 A 2/2007

OTHER PUBLICATIONS

Machine Translation of CN109915270B PDF File Name: "CN109915270B_Machine_Translation.pdf" (Year: 2021).*
(Continued)

*Primary Examiner* — Grant Moubry
*Assistant Examiner* — Ruben Picon-Feliciano
(74) *Attorney, Agent, or Firm* — Crowell & Moring LLP

(57) ABSTRACT

The present disclosure provides a control device for an internal combustion engine which is capable of reducing an overshoot of a fuel pressure in a common rail with respect to a target pressure. A control device 100 for the internal combustion engine includes an amount-of-injection control unit 110, and a pressure control unit 120. The pressure control unit 120 includes a feedback control unit 121, a discharge flow rate calculation unit 122, a discharge flow rate restricting unit 123, and an energization start angle calculation unit 124. The feedback control unit 121 calculates a target discharge flow rate FRt of a fuel discharged from a high-pressure fuel pump to a common rail, based on the pressure deviation ΔP between a fuel pressure Pf and a target pressure Pt. The discharge flow rate calculation unit 122 calculates a balanced discharge flow rate FRb by increasing or decreasing the target discharge flow rate FRt such that the target discharge flow rate FRt is balanced with the flow rate of the fuel flowed out from the common rail by being injected through injectors. The discharge flow rate restricting unit 123 outputs the restricted discharge flow rate FRr having its upper limit corresponding to the balanced
(Continued)

discharge flow rate FRb, based on the pressure deviation ΔP. The energization start angle calculation unit 124 calculates an energization start angle θes, which is a phase angle of the reciprocating motion of a plunger at the start of energization of the electromagnetic valve in the high-pressure fuel pump, based on the restricted discharge flow rate FRr.

7 Claims, 6 Drawing Sheets

(52) U.S. Cl.
CPC ................ *F02D 2041/1412* (2013.01); *F02D 2041/389* (2013.01); *F02D 2200/0602* (2013.01); *F02D 2200/0616* (2013.01)

(56) References Cited

OTHER PUBLICATIONS

International Search Report (PCT/ISA/210) issued in PCT Application No. PCT/JP2022/046379 dated Feb. 7, 2023 with English translation (5 pages).

Japanese-language Written Opinion (PCT/ISA/237) issued in PCT Application No. PCT/JP2022/046379 dated Feb. 7, 2023 with English translation (6 pages).

* cited by examiner

CONTROL DEVICE FOR INTERNAL COMBUSTION ENGINE

TECHNICAL FIELD

The present disclosure relates to control devices for internal combustion engines.

BACKGROUND ART

Conventionally, there have been known inventions relating to techniques for controlling fuel systems for internal combustion engines. For example, Patent Literature 1 which will be described below describes a control device for controlling an internal combustion engine including an engine-driven type high-pressure fuel pump for supplying a high-pressure fuel from a fuel tank to fuel injection means. The high-pressure fuel pump is driven by a cam in the internal combustion engine. By closing an on-off valve in an inlet side of the high-pressure fuel pump at a desired timing based on the angle of a shaft for driving the cam, the high-pressure fuel in a desired amount is discharged therefrom.

The aforementioned conventional control device includes means for detecting a rotating speed of the internal combustion engine, means for detecting the pressure of the high-pressure fuel, and control means for performing feedback-control on the high-pressure fuel pump such that the detected pressure of the high-pressure fuel comes to be a target pressure. The aforementioned control means includes means for calculating a deviation between the detected pressure of the high-pressure fuel and the target pressure, means for calculating an amount of feedback manipulation based on the deviation, and calculation means for calculating a required amount of discharge from the high-pressure fuel pump based on the amount of feedback manipulation.

In addition, the aforementioned control means includes means for calculating the angle of the shaft that satisfies the aforementioned required amount of discharge in consideration of the rotating speed of the internal combustion engine and the detected pressure of the high-pressure fuel, and means for controlling the on-off valve in such a way as to close the on-off valve when the calculated angle of the shaft is reached.

In addition, the aforementioned conventional control device further includes determination means for determining an operating state of the internal combustion engine, storage means for storing a parameter value for the feedback control in correspondence with the operating state, and means for changing a parameter value for the feedback control to the stored parameter value if it is determined that the internal combustion engine has been shifted to the aforementioned specific operating state (PTL 1, paragraph 0017, and claim 1).

CITATION LIST

Patent Literature

PTL 1: JP 2007-032321 A

SUMMARY OF INVENTION

Technical Problem

The fuel discharged from the high-pressure fuel pump is supplied to a common rail for supplying the high-pressure fuel to a plurality of injectors and, further, is injected through the respective injectors. The aforementioned conventional control device performs feedback control using the deviation between the pressure of the high-pressure fuel and the target pressure. Therefore, if the amount of injection through the injectors rapidly decreases with respect to the amount of the fuel discharge from the high-pressure fuel pump, the fuel pressure in the common rail may exceed the target pressure to cause an overshoot and may exceed an allowable value.

The present disclosure provides a control device for an internal combustion engine which is capable of reducing an overshoot of a fuel pressure in a common rail with respect to a target pressure.

Solution to Problem

According to one aspect of the present disclosure, there is provided a control device for an internal combustion engine adapted to supply a fuel discharged from a high-pressure fuel pump to an injector through a common rail, the high-pressure fuel pump including a pressurizing chamber, an electromagnetic valve adapted to open a fuel supply path to the pressurizing chamber when being energized, and a plunger adapted to perform reciprocating motion for introducing the fuel into the pressurizing chamber through the electromagnetic valve and pressurizing the fuel, the control device including: an amount-of-injection control unit adapted to control an amount of the fuel injected through the injector to a target amount of injection; and a pressure control unit adapted to control a discharge flow rate of the fuel discharged from the high-pressure fuel pump for controlling a fuel pressure in the common rail to a target pressure, wherein the pressure control unit includes a feedback control unit adapted to calculate a target discharge flow rate of the fuel discharged from the high-pressure fuel pump to the common rail, based on a pressure deviation between the fuel pressure and the target pressure, a discharge flow rate calculation unit adapted to calculate a balanced discharge flow rate by increasing or decreasing the target discharge flow rate such that the target discharge flow rate of the fuel to the common rail is balanced with the flow rate of the fuel flowed out from the common rail by being injected through the injector, a discharge flow rate restricting unit adapted to output a restricted discharge flow rate having an upper limit corresponding to the balanced discharge flow rate, based on the pressure deviation, and an energization start angle calculation unit adapted to calculate a phase angle of the reciprocating motion of the plunger at start of energization of the electromagnetic valve in the high-pressure fuel pump, based on the restricted discharge flow rate.

Advantageous Effects of Invention

According to the aforementioned one aspect of the present disclosure, it is possible to provide a control device for an internal combustion engine which is capable of reducing an overshoot of the fuel pressure in a common rail with respect to a target pressure.

DESCRIPTION OF EMBODIMENTS

Figure 1:
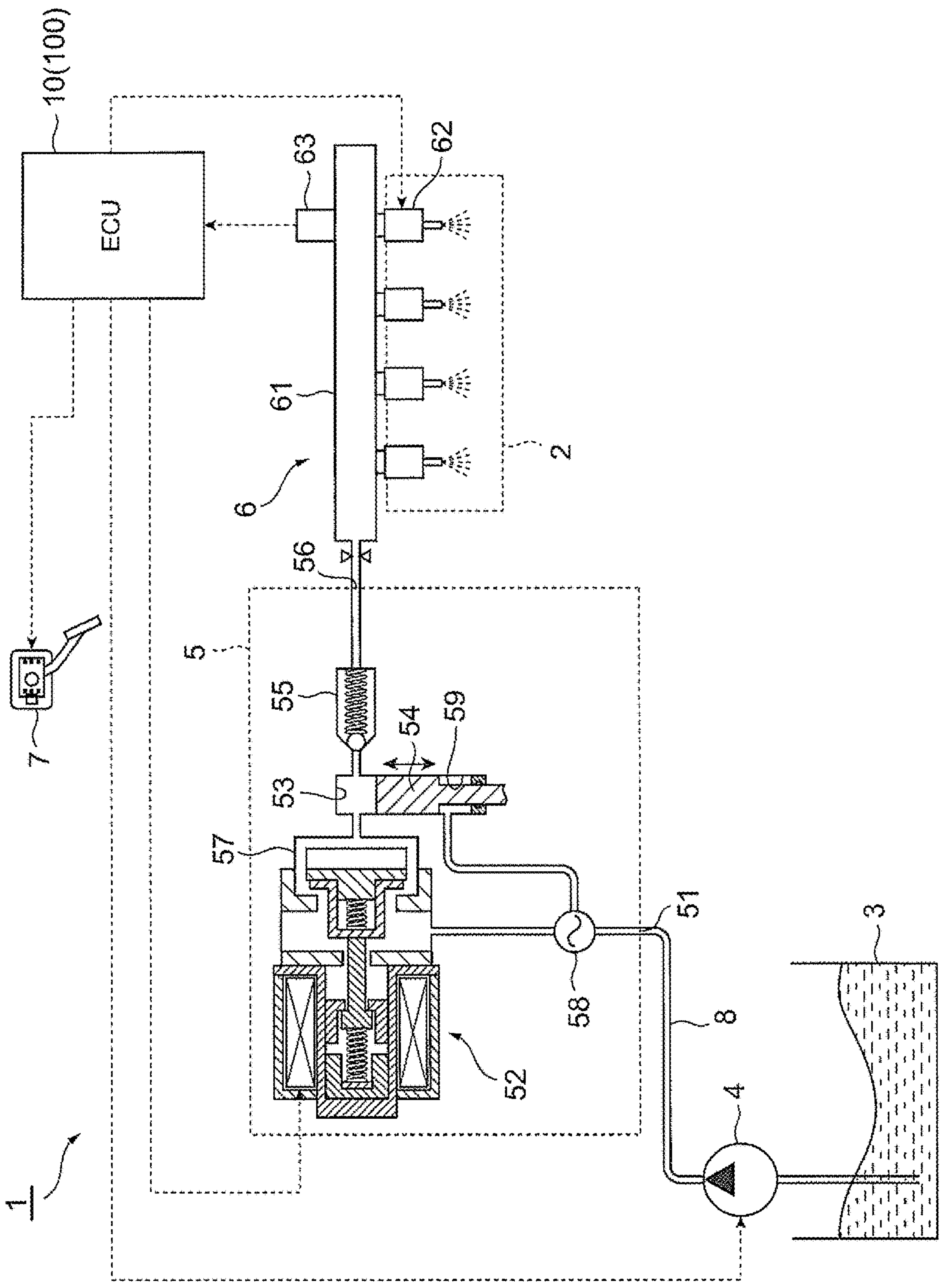
FIG. 1 is a block diagram illustrating an embodiment of a control device for an internal combustion engine according to the present disclosure.

FIG. 1 is a block diagram illustrating an embodiment of a control device for an internal combustion engine according to the present disclosure. The control device for the internal combustion engine according to the present embodiment is constituted by, for example, an electronic control unit (ECU) 10, which is a part of an engine system 1 incorporated in a vehicle. The engine system 1 includes, for example, an engine 2 as an internal combustion engine, a fuel tank 3, a low-pressure fuel pump 4, a high-pressure fuel pump 5, a fuel injection device 6, an accelerator opening sensor 7, and the ECU10.

The engine 2 includes, for example, an air intake pipe, a throttle body, a throttle valve, an air intake manifold, an air intake port, a cylinder, an ignition plug, a piston, a crank shaft, a cam shaft, an air exhaust port, an air exhaust pipe, and the like, which are not illustrated. The engine 2 introduces sucked air into the air intake pipe, based on the operation of the piston, for example. While the sucked air introduced into the air intake pipe passes through the throttle body, the sucked air is controlled in flow rate by the throttle valve provided in the throttle body.

The sucked air passed through the throttle body passes through the air intake manifold and, further, is mixed with a fuel injected through injectors 62 provided in the air intake port, and the sucked air in a state of being an air-fuel mixed gas is guided to a combustion chamber in the cylinder. The ignition plug explosively combusts the air-fuel mixed gas in the combustion chamber by spark ignition to generate mechanical energy, thereby rotating the crank shaft and the cam shaft coupled to the piston. The gas generated by the combustion is discharged from the combustion chamber in the cylinder to the air exhaust pipe through the air exhaust port, and is discharged as exhaust gas from the air exhaust pipe to the outside of the vehicle.

The fuel tank 3 stores a liquid fuel such as a gasoline, a light oil, or ethanol, for example. The low-pressure fuel pump 4 is provided, for example, halfway through a fuel supply path 8 connecting the fuel tank 3 and the high-pressure fuel pump 5 to each other. The low-pressure fuel pump 4 feeds the fuel, in a pressurizing manner, from the fuel tank 3 to the high-pressure fuel pump 5 through the fuel supply path 8. The high-pressure fuel pump 5 pressurizes the fuel supplied through the fuel supply path 8 and discharges the fuel to a common rail 61 in the fuel injection device 6, for example.

Incidentally, the fuel discharge pressure in the low-pressure fuel pump 4 is lower than the fuel discharge pressure in the high-pressure fuel pump 5, and the fuel discharge pressure in the high-pressure fuel pump 5 is higher than the fuel discharge pressure in the low-pressure fuel pump 4. Namely, "low pressure" and "high pressure" in the low-pressure fuel pump 4 and the high-pressure fuel pump 5 indicate a relative relationship between the discharge pressures in the respective fuel pumps, and do not define a specific pressure range.

The high-pressure fuel pump 5 includes, for example, a suction port 51, an electromagnetic valve 52, a pressurizing chamber 53, a plunger 54, a discharge valve 55, and a discharge port 56. The suction port 51 is connected to, for example, the fuel supply path 8, and the fuel fed in a pressurized manner by the low-pressure fuel pump 4 is introduced thereinto. The electromagnetic valve 52 is provided, for example, halfway through a fuel supply path 57 for supplying the fuel from the suction port 51 to the pressurizing chamber 53. The ECU10 controls opening and closing of the electromagnetic valve 52, thereby opening and closing the fuel supply path 57 for supplying the fuel to the pressurizing chamber 53.

The fuel is introduced into the pressurizing chamber 53 from the fuel tank 3 through the low-pressure fuel pump 4. More specifically, the fuel introduced from the fuel tank 3 into the suction port 51 through the low-pressure fuel pump 4 is passed through the fuel supply path 57 from the suction port 51 to the pressurizing chamber 53, and through the electromagnetic valve 52 adapted to open the fuel supply path 57 during being energized, and is introduced into the pressurizing chamber 53, due to the reciprocating motion of the plunger 54. The high-pressure fuel pump 5 may include, for example, a pulsation reducing unit 58 for reducing pulsation in the pressure of the fuel sucked through the suction port 51 and discharged through the discharge port 56.

The plunger 54 performs reciprocating motion, thereby introducing the fuel into the pressurizing chamber 53 through the electromagnetic valve 52 and pressurizing the fuel. The plunger 54 is housed in a cylinder 59 and defines the pressurizing chamber 53 together with the cylinder 59, for example. The plunger 54 is provided such that it can be reciprocated in the axial direction by a drive mechanism (not illustrated). The drive mechanism causes the plunger 54 to perform reciprocating motion in the axial direction, through the rotation of a cam attached to the cam shaft in the engine 2, for example.

The phase angle $\theta p$ of the reciprocating motion of the plunger 54 is detected by, for example, a cam angle sensor for detecting the rotation angle of the cam shaft, and the detected phase angle is inputted to the ECU10. Namely, the phase angle $\theta p$ of the reciprocating motion of the plunger 54 can be calculated based on the rotation angle of the cam shaft, and the cam angle sensor functions as an angle sensor for detecting the phase angle $\theta p$ of the plunger 54 in the high-pressure fuel pump 5.

The discharge valve 55 is provided between the pressurizing chamber 53 and the discharge port 56. In a state where there is no differential pressure between the fuel inside the pressurizing chamber 53 and the fuel downstream of the discharge valve 55, the discharge valve 55 is in a closed state, since a valve body comes in contact with a seat surface of a seat member due to the biasing force of a spring. If the pressure of the fuel inside the pressurizing chamber 53 becomes higher than the pressure of the fuel downstream of the discharge valve 55, and the differential pressure therebetween exceeds the biasing force of the spring, the valve body is separated from the seat surface of the seat member, which brings the discharge valve 55 into an open state. The discharge port 56 is connected to, for example, the common rail 61 in the fuel injection device 6, and the fuel at a high pressure which has been pressurized in the pressurizing chamber 53 is discharged through the discharge port 56 to the common rail 61.

The fuel injection device 6 includes, for example, the common rail 61, the injectors 62, and a pressure sensor 63. The common rail 61 stores the high-pressure fuel discharged from the high-pressure fuel pump 5, and supplies the high-pressure fuel to the plurality of injectors 62. Each of the injectors 62 injects the high-pressure fuel supplied through the common rail 61 into the cylinder in the engine 2, for example. The pressure sensor 63 detects the pressure of the high-pressure fuel discharged from the high-pressure fuel pump 5 to the common rail 61, and outputs the detected fuel pressure Pf in the common rail 61 to the ECU10 through a signal line.

The accelerator opening sensor 7 is connected to, for example, the ECU10 through a signal line. The accelerator opening sensor 7 detects the amount of treading on an accelerator pedal by a driver of the vehicle, as a degree of opening of an accelerator, and outputs the detected degree of opening of the accelerator to the ECU10. The ECU10 is constituted by one or more microcontrollers, for example. The ECU10 is connected to the low-pressure fuel pump 4, the high-pressure fuel pump 5, and the fuel injection device 6 through signal lines, and controls the low-pressure fuel pump 4, the high-pressure fuel pump 5, and the fuel injection device 6.

Figure 2:
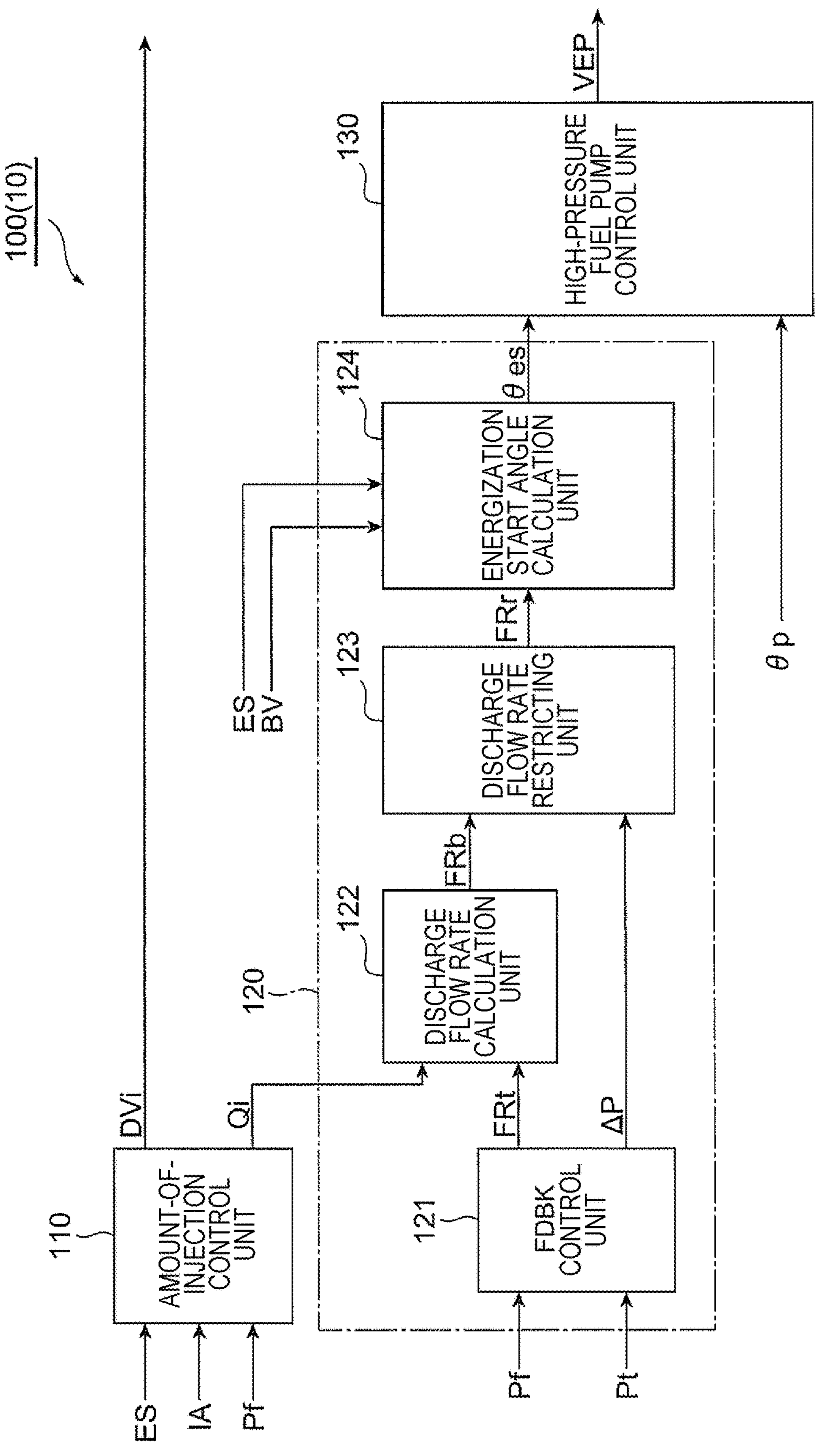
FIG. 2 is a functional block diagram of the control device for the internal combustion engine of FIG. 1.

FIG. 2 is a functional block diagram of the control device 100 for the internal combustion engine, which is constituted by the ECU10 in FIG. 1. The control device 100 for the internal combustion engine according to the present embodiment includes an amount-of-injection control unit 110, and a pressure control unit 120. Further, the control device 100 for the internal combustion engine includes, for example, a high-pressure fuel pump control unit 130. The respective units in the control device 100 for the internal combustion engine illustrated in FIG. 2 indicate, for example, respective functions of the control device 100 for the internal combustion engine, wherein, for example, a central processing unit (CPU) in the ECU10 executes programs stored in a memory such as a ROM or a RAM to realize these respective functions.

The amount-of-injection control unit 110 controls the amount of fuel injected through each injector 62 to a target amount of injection Qi, based on the state of operation of the engine 2 as an internal combustion engine, for example. More specifically, for example, a rotating speed ES of the engine 2 based on a result of detection by a rotation sensor for detecting the rotation of the crankshaft, an amount of sucked air IA based on a result of detection by an air flow sensor provided in an air intake path in the engine 2, and a fuel pressure Pf in the common rail 61 which is detected by the pressure sensor 63 are inputted to the control device 100 for the internal combustion engine.

The amount-of-injection control unit 110 calculates the target amount of injection Qi of the fuel to be injected through the injectors 62, based on the state of operation of the internal combustion engine, which includes the rotating speed ES, the amount of sucked air IA, and the fuel pressure Pf having been inputted thereto, for example. Further, the amount-of-injection control unit 110 outputs, to the injectors 62, a driving voltage DVi for causing the injectors 62 to inject the fuel in the target amount of injection Qi. The driving voltage DVi is, for example, a pulse-shaped voltage signal for controlling the time period of energization of the injectors 62.

The pressure control unit 120 controls the discharge flow rate FR of the fuel discharged from the high-pressure fuel pump 5, thereby controlling the fuel pressure Pf in the common rail 61 to a target pressure Pt. More specifically, the pressure control unit 120 includes a feedback control unit 121, a discharge flow rate calculation unit 122, a discharge flow rate restricting unit 123, and an energization start angle calculation unit 124.

For example, the fuel pressure Pf in the common rail 61 detected by the pressure sensor 63 provided in the common rail 61, and the target pressure Pt of the fuel in the common rail 61 are inputted to the feedback control unit 121. The feedback control unit 121 calculates, for example, a pressure deviation ΔP between the inputted fuel pressure Pf and the target pressure Pt.

The feedback control unit 121 outputs the calculated pressure deviation ΔP to the discharge flow rate restricting unit 123, for example. Further, the feedback control unit 121 calculates a target discharge flow rate FRt of the fuel discharged from the high-pressure fuel pump 5 to the common rail 61, based on the pressure deviation ΔP. The feedback control unit 121 outputs the calculated target discharge flow rate FRt to the discharge flow rate calculation unit 122.

The target discharge flow rate FRt in the high-pressure fuel pump 5, which has been outputted from the feedback control unit 121, is inputted to the discharge flow rate calculation unit 122. Further, the discharge flow rate calculation unit 122 acquires the target amount of injection Qi through the injectors 62, from the amount-of-injection control unit 110, for example, and calculates the flow rate of the fuel flowed out from the common rail 61, based on the target amount of injection Qi.

Figure 3:
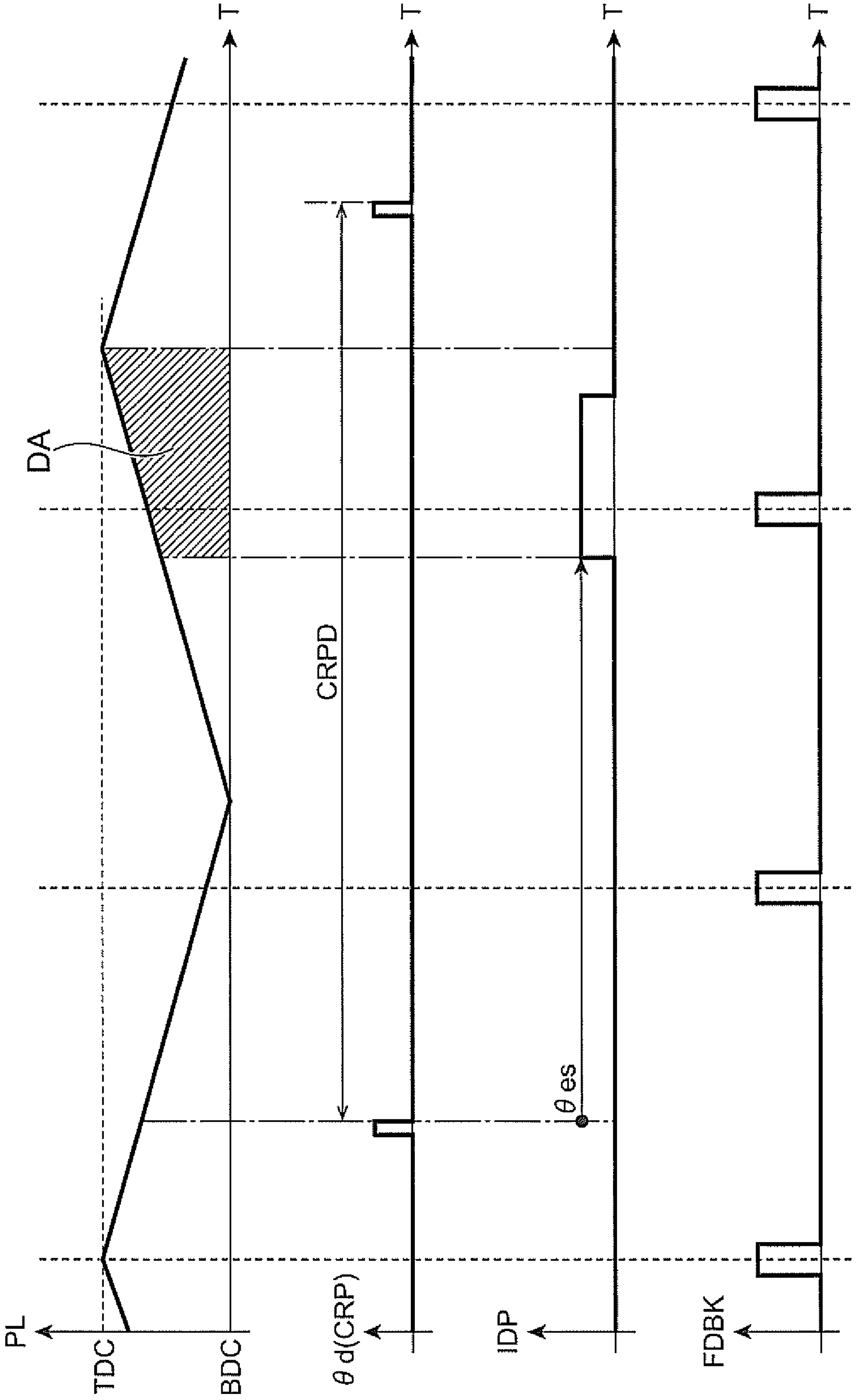
FIG. 3 is a time chart illustrating calculation timings in the control device for the internal combustion engine in FIG. 2.

FIG. 3 is a time chart illustrating calculation timings in feedback control in the control device 100 for the internal combustion engine illustrated in FIG. 2. In FIG. 3, an uppermost graph shows the amount of lift PL of the plunger 54 in the high-pressure fuel pump 5. The plunger 54 performs reciprocating motion between a top dead center TDC and a bottom dead center BCD, and discharges the fuel in, for example, a hatched region DA from before the top dead center TDC up to the top dead center TDC.

A second graph from the top of FIG. 3 indicates timings of inputting of the value θd detected by the sensor for detecting the angle of the air exhaust cam in the engine 2. The timings of inputting of the detected value θd of the angle of the air exhaust cam form control reference positions CRP for the high-pressure fuel pump 5, for example. Namely, the interval of inputting of the value of the angle of the air exhaust cam detected by the sensor is the control reference position interval CRPD for the high-pressure fuel pump 5.

A third graph from the top of FIG. 3 shows a driving pulse IDP for the injectors 62. The driving pulse IDP for the injectors 62 rises after the elapse of a predetermined time period since an energization start θes, which is a phase angle of the plunger 54 at which energization of the electromagnetic valve 52 in the high-pressure fuel pump 5 is started. As a result, the fuel is injected from the injectors 62 at the timing when the fuel is discharged from the high-pressure fuel pump 5.

A lowermost graph in FIG. 3 shows timings of calculations for feedback (FDBK) control by the control device 100 for the internal combustion engine. Based on operating states of the internal combustion engine at each calculation timing, for example, the amount-of-injection control unit 110 predicts the target amount of injection Qi through the injectors 62 at the timing of fuel discharge from the high-pressure fuel pump 5 after the calculation timing.

The operating states of the internal combustion engine for use in the calculation of the target amount of injection Qi by the amount-of-injection control unit 110 include, for example, the rotating speed ES of the engine 2, the amount of sucked air IA, and the fuel pressure Pf in the common rail 61 as illustrated in FIG. 2. The discharge flow rate calculation unit 122 calculates the flow rate of the fuel flowed out from the common rail 61, based on the target amount of injection Qi through the injectors 62, which has been calculated based on the aforementioned operating states of the internal combustion engine.

Also, the discharge flow rate calculation unit 122 may acquire the driving voltage DVi from the amount-of-injection control unit 110 and may calculate the flow rate of the fuel flowed out from the common rail 61 by being injected through each injector 62, based on the driving voltage DVi, for example. More specifically, the discharge flow rate calculation unit 122 calculates the amount of the fuel injected through each injector 62, using the fuel pressure Pf, and the valve opening time period based on the driving voltage DVi for the injectors 62, for example.

Further, the discharge flow rate calculation unit 122 calculates the flow rate of the fuel flowed out from the common rail 61 using the calculated amount of the fuel injected. Thereafter, the discharge flow rate calculation unit 122 calculates a balanced discharge flow rate FRb by increasing or decreasing the target discharge flow rate FRt, such that the flow rate of the fuel flowed out from the common rail 61 is balanced with the target discharge flow rate FRt of the fuel from the high-pressure fuel pump 5 to the common rail 61, which has been inputted from the feedback control unit 121.

Figure 4:
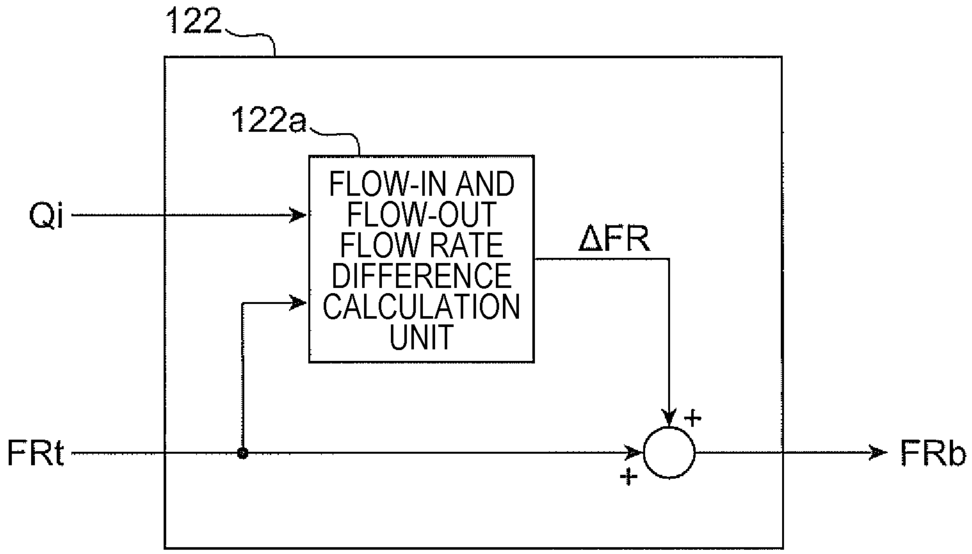
FIG. 4 is a block diagram illustrating an example of the structure of a discharge flow rate calculation unit in FIG. 2.

FIG. 4 is a block diagram illustrating an example of the discharge flow rate calculation unit 122. In the example illustrated in FIG. 4, the discharge flow rate calculation unit 122 includes, for example, a flow-in and flow-out flow rate difference calculation unit 122*a*. For example, the flow-in and flow-out flow rate difference calculation unit 122*a* calculates the flow rate of the fuel flowed out from the common rail 61 based on the target amount of injection Qi through the injectors 62. Further, the flow-in and flow-out flow rate difference calculation unit 122*a* calculates a flow-in and flow-out flow rate difference ΔFR by subtracting the target discharge flow rate FRt from the flow rate of the fuel flowed out. Further, the discharge flow rate calculation unit 122 calculates a balanced discharge flow rate FRb, by adding the calculated flow-in and flow-out flow rate difference ΔFR to the target discharge flow rate FRt.

In this case, when the flow rate of the fuel flowed out from the common rail 61 due to the injection through the injectors 62 is smaller than the target discharge flow rate FRt of the fuel from the high-pressure fuel pump 5 to the common rail 61, the flow-in and flow-out flow rate difference ΔFR is negative. As a result, the flow-in and flow-out flow rate difference ΔFR, which is negative, is added to the target discharge flow rate FRt, which decreases the balanced discharge flow rate FRb from the target discharge flow rate FRt. On the other hand, when the flow rate of the fuel flowed out from the common rail 61 is larger than the target discharge flow rate FRt of the fuel flowed into the common rail 61, the flow-in and flow-out flow rate difference ΔFR is positive. As a result, the flow-in and flow-out flow rate difference ΔFR, which is positive, is added to the target discharge flow rate FRt, which increases the balanced discharge flow rate FRb from the target discharge flow rate FRt.

Figure 5:
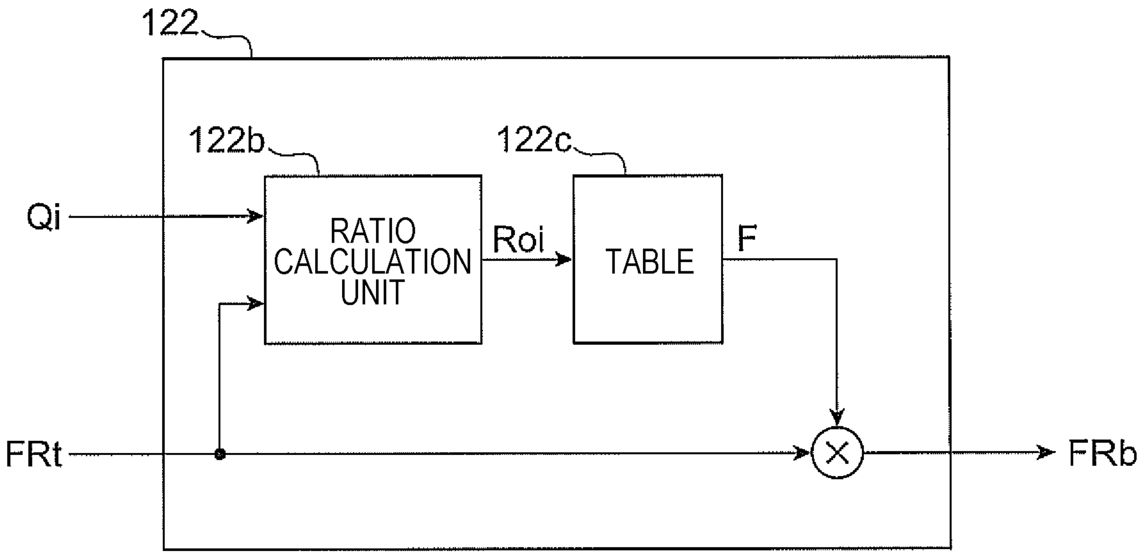
FIG. 5 is a block diagram illustrating another example of the structure of the discharge flow rate calculation unit in FIG. 2.

FIG. 5 is a block diagram illustrating another example of the discharge flow rate calculation unit 122. In the example illustrated in FIG. 5, the discharge flow rate calculation unit 122 includes a ratio calculation unit 122*b* and a table 122*c*, and calculates a balanced discharge flow rate FRb based on the ratio Roi between the flow rate of the fuel flowed out from the common rail 61 and the target discharge flow rate FRt of the fuel flowed into the common rail 61.

More specifically, for example, the ratio calculation unit 122*b* calculates the flow rate of the fuel flowed out from the common rail 61, based on the target amount of injection Qi acquired from the amount-of-injection control unit 110. Further, for example, the ratio calculation unit 122*b* calculates the ratio Roi between the flow rate of the fuel flowed out and the target discharge flow rate FRt, by dividing the calculated flow rate of the fuel flowed out by the target discharge flow rate FRt inputted from the feedback control unit 121.

Further, the table 122*c* outputs a coefficient F corresponding to the ratio Roi inputted from the flow-in and flow-out flow rate difference calculation unit 122*a*, for example. The discharge flow rate calculation unit 122 calculates the balanced discharge flow rate FRb, by multiplying the target discharge flow rate FRt inputted from the feedback control unit 121 by the coefficient F outputted from the table 122*c*.

As a result, when the flow rate of the fuel flowed out from the common rail 61 is smaller than the target discharge flow rate FRt of the fuel flowed into the common rail 61, the ratio Roi and the coefficient F are less than 1, which decreases the balanced discharge flow rate FRb from the target discharge flow rate FRt. On the other hand, when the flow rate of the fuel flowed out from the common rail 61 is larger than the target discharge flow rate FRt of the fuel flowed into the common rail 61, the ratio Roi and the coefficient F are larger than 1, which increases the balanced discharge flow rate FRb from the target discharge flow rate FRt.

Figure 6:
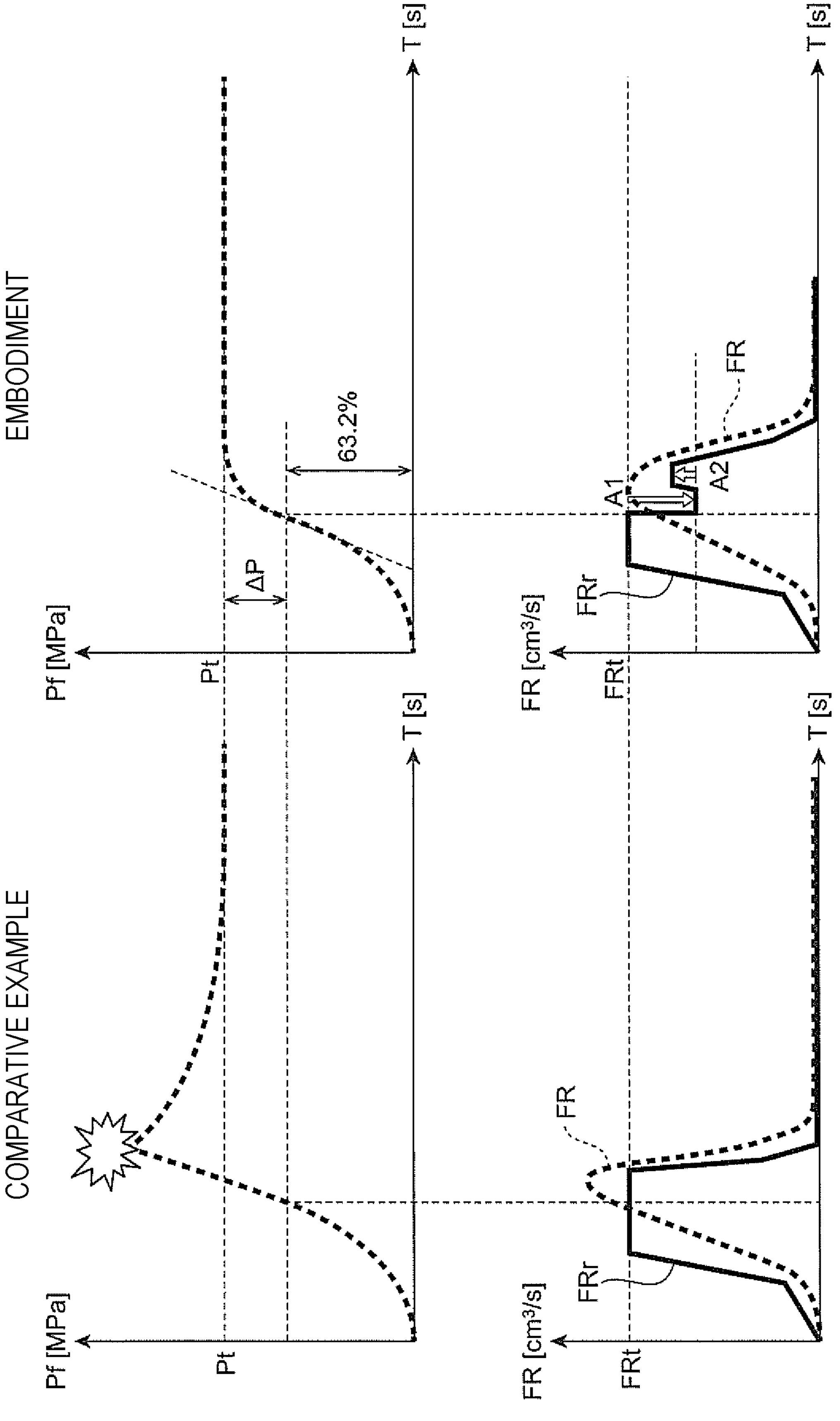
FIG. 6 is a graph illustrating an example of the output of a discharge flow rate restricting unit in FIG. 2.

FIG. 6 is a graph illustrating an example of a restricted discharge flow rate FRr outputted from the discharge flow rate restricting unit 123. In FIG. 6, upper and lower graphs in the left side show a temporal change in the fuel pressure Pf in the common rail 61, and a temporal change in the discharge flow rate FR in the high-pressure fuel pump 5, under the control of a control device for an internal combustion engine in a comparative example, which is different from the control device for the internal combustion engine according to the present disclosure. Further, upper and lower graphs in the right side of FIG. 6 show a temporal change in the fuel pressure Pf in the common rail 61, and temporal changes in the restricted discharge flow rate FRr and the discharge flow rate FR in the high-pressure fuel pump 5, under the control of the control device 100 for the internal combustion engine according to the present embodiment.

As illustrated in FIG. 2, the pressure deviation ΔP outputted from the feedback control unit 121, and the balanced discharge flow rate FRb outputted from the discharge flow rate calculation unit 122 are inputted to the discharge flow rate restricting unit 123. The discharge flow rate restricting unit 123 outputs the restricted discharge flow rate FRr having its upper limit corresponding to the balanced discharge flow rate FRb, based on the pressure deviation ΔP. For example, the discharge flow rate restricting unit 123 calculates an amount of change of the pressure deviation ΔP between the target pressure Pt of the fuel inside the common rail 61 and the fuel pressure Pf in the common rail 61 detected by the pressure sensor 63.

The discharge flow rate restricting unit 123 predicts an occurrence of such an overshoot as to cause the fuel pressure Pf to exceed the target pressure Pt, based on the amount of change of the pressure deviation ΔP. More specifically, for example, if, at the time when the fuel pressure Pf has reached 63.2% of the target pressure Pt, the amount of change of the pressure deviation ΔP exceeds a threshold value, the discharge flow rate restricting unit 123 predicts an occurrence of an overshoot, as illustrated in the upper right graph in FIG. 6. If the amount of change of the pressure deviation ΔP is equal to or less than the threshold value, and an occurrence of an overshoot is not predicted, the discharge flow rate restricting unit 123 outputs a restricted discharge flow rate FRr equal to the balanced discharge flow rate FRb inputted from the discharge flow rate calculation unit 122.

On the other hand, if the discharge flow rate restricting unit 123 predicts an occurrence of an overshoot, the discharge flow rate restricting unit 123 outputs a restricted discharge flow rate FRr which is smaller than the balanced discharge flow rate FRb inputted from the discharge flow rate restricting unit 123, thereby suppressing the aforementioned overshoot, as indicated by an arrow A1 in the lower right graph in FIG. 6, for example. Furthermore, the discharge flow rate restricting unit 123 makes the restricted discharge flow rate FRr closer to the balanced discharge flow rate FRb, as indicated by an arrow A2 in the lower right graph in FIG. 6, for example, according to the decrease of the pressure deviation ΔP between the fuel pressure Pf in the common rail 61 and the target pressure Pt.

The restricted discharge flow rate FRr outputted from the discharge flow rate restricting unit 123 is inputted to the energization start angle calculation unit 124 as illustrated in FIG. 2. Further, for example, the rotating speed ES and a battery voltage BV are inputted to the energization start angle calculation unit 124. The energization start angle calculation unit 124 calculates an energization start angle θes, which is a phase angle of the reciprocating motion of the plunger 54 at the start of energization of the electromagnetic valve 52 in the high-pressure fuel pump 5, for example, based on the restricted discharge flow rate FRr, the rotating speed ES, and the battery voltage BV. The energization start angle calculation unit 124 outputs the calculated energization start θes to the high-pressure fuel pump control unit 130.

For example, the energization start angle θes outputted from the energization start angle calculation unit 124, and the phase angle θp of the plunger 54 outputted from the cam angle sensor are inputted to the high-pressure fuel pump control unit 130, wherein the cam angle sensor detects the rotation angle of the cam shaft, which causes the plunger 54 to perform reciprocating motion. The high-pressure fuel pump control unit 130 outputs a driving pulse VEP for driving the electromagnetic valve 52 in the high-pressure fuel pump 5, based on the energization start θes and the phase angle θp of the plunger 54.

Hereinafter, there will be described effects of the control device 100 for the internal combustion engine according to the present embodiment, based on comparison with the control device for the internal combustion engine in the comparative example.

As illustrated in FIG. 1, for example, in a gasoline direct-injection type engine system 1, the fuel pressurized by the high-pressure fuel pump 5 is discharged to the common rail 61, and the fuel is injected through the injectors 62 into the combustion chamber in the engine 2. The ECU10 controls the discharge flow rate FR, which is the flow rate of the fuel discharged from the high-pressure fuel pump 5 to the common rail 61, and performs feedback control of the fuel pressure Pf such that the fuel pressure Pf inside the common rail 61 comes to be the target pressure Pt, for example.

However, in the control device for the internal combustion engine in the comparative example, which does not have the characteristic part of the control device for the internal combustion engine according to the present disclosure, the following problem may occur. For example, if the amount of the fuel injected through the injectors 62 rapidly decreases with respect to the discharge flow rate FR of the fuel flowing into the common rail 61, the fuel pressure Pf in the common rail 61 may exceed the target pressure Pt, thereby inducing an overshoot, as illustrated in the graph of the comparative example in the upper left in FIG. 6.

On the other hand, the control device 100 for the internal combustion engine according to the present embodiment has the following structures. As illustrated in FIG. 1, the control device 100 for the internal combustion engine according to the present embodiment is constituted by the ECU10 adapted to control the engine 2 as the internal combustion engine, which is adapted to supply the fuel discharged from the high-pressure fuel pump 5 to the injectors 62 through the common rail 61. The high-pressure fuel pump 5 includes the pressurizing chamber 53, the electromagnetic valve 52 adapted to open the fuel supply path 57 to the pressurizing chamber 53 when being energized, and the plunger 54 adapted to perform reciprocating motion for introducing the fuel into the pressurizing chamber 53 through the electromagnetic valve 52 and pressurizing the fuel. As illustrated in FIG. 2, the control device 100 for the internal combustion engine according to the present embodiment includes the amount-of-injection control unit 110 for controlling the amount of the fuel injected through the injectors 62 to the target amount of injection Qi, and the pressure control unit 120 for controlling the discharge flow rate FR of the fuel discharged from the high-pressure fuel pump 5 for controlling the fuel pressure Pf in the common rail 61 to the target pressure Pt. The pressure control unit 120 includes the feedback control unit 121, the discharge flow rate calculation unit 122, the discharge flow rate restricting unit 123, and the energization start angle calculation unit 124. The feedback control unit 121 calculates a target discharge flow rate FRt of the fuel discharged from the high-pressure fuel pump 5 to the common rail 61, based on the pressure deviation ΔP between the fuel pressure Pf and the target pressure Pt. The discharge flow rate calculation unit 122 calculates a balanced discharge flow rate FRb by increasing or decreasing the target discharge flow rate FRt such that the target discharge flow rate FRt of the fuel to the common rail 61 is balanced with the flow rate of the fuel flowed out from the common rail 61 by being injected through the injectors 62. The discharge flow rate restricting unit 123 outputs a restricted discharge flow rate FRr having its upper limit corresponding to the balanced discharge flow rate FRb, based on the pressure deviation ΔP inputted from the feedback control unit 121. The energization start angle calculation unit 124 calculates an energization start θes, which is a phase angle of the reciprocating motion of the plunger 54 at the start of energization of the electromagnetic valve 52 in the high-pressure fuel pump 5, based on the restricted discharge flow rate FRr.

With the aforementioned structure, in the control device 100 for the internal combustion engine according to the present embodiment, for example, even if the amount of the fuel injected through the injectors 62 rapidly decreases with respect to the discharge flow rate FR of the fuel flowing into the common rail 61, it is possible to suppress an overshoot of the fuel pressure Pf with respect to the target pressure Pt, as illustrated in the upper right graph in FIG. 6. More specifically, if the amount of the fuel injected through the injectors 62 rapidly decreases, this rapidly decreases the flow rate of the fuel flowed out from the common rail 61 calculated by the discharge flow rate calculation unit 122. As a result, the discharge flow rate calculation unit 122 outputs a balanced discharge flow rate FRb decreased from the target discharge flow rate FRt so as to balance the rapidly decreased flow rate of the fuel flowed out with the target discharge flow rate FRt of the fuel to the common rail 61. Furthermore, the discharge flow rate restricting unit 123 outputs a restricted discharge flow rate FRr having its upper limit corresponding to the balanced discharge flow rate FRb and obtained by restricting the balanced discharge flow rate FRb based on the pressure deviation ΔP between the fuel pressure Pf in the common rail 61 and the target pressure Pt. Further, the energization start angle calculation unit 124 outputs an energization start angle θes based on the restricted discharge flow rate FRr, and the high-pressure fuel pump 5 is controlled based on the energization start angle θes. As a result, as indicated by the arrow A1 in the lower right graph in FIG. 6, the fuel is discharged from the high-pressure fuel pump 5 to the common rail 61 at the restricted discharge flow rate FRr decreased from the target discharge flow rate FRt. This suppresses such an overshoot as to cause the fuel pressure Pf to exceed the target pressure Pt, as indicated in the upper right graph in FIG. 6. Therefore, with the control device 100 for the internal combustion engine according to the present embodiment, it is possible to suppress an overshoot of the fuel pressure Pf in the common rail 61 with respect to the target pressure Pt, thereby improving the air exhaust performance and the fuel consumption performance of the engine 2.

Further, in the control device 100 for the internal combustion engine according to the present embodiment, for example, as illustrated in FIG. 4, the discharge flow rate calculation unit 122 calculates a flow-in and flow-out flow rate difference ΔFR by subtracting the target discharge flow rate FRt from the flow rate of the fuel flowed out from the common rail 61 based on the target amount of injection Qi through the injectors 62. Further, the discharge flow rate calculation unit 122 calculates a balanced discharge flow rate FRb by adding the calculated flow-in and flow-out flow rate difference ΔFR to the target discharge flow rate FRt.

With the aforementioned structure, the discharge flow rate calculation unit 122 can output the balanced discharge flow rate FRb obtained by increasing or decreasing the target discharge flow rate FRt in the high-pressure fuel pump 5 according to the increase or decrease of the flow rate of the fuel flowed out from the common rail 61 due to the increase or decrease of the target amount of injection Qi through the injectors 62. Therefore, with the control device 100 for the internal combustion engine according to the present embodiment, it is possible to suppress an overshoot of the fuel pressure Pf in the common rail 61 with respect to the target pressure Pt, thereby improving the air exhaust performance and the fuel consumption performance of the engine 2.

Also, in the control device 100 for the internal combustion engine according to the present embodiment, for example, as illustrated in FIG. 5, the discharge flow rate calculation unit 122 calculates the ratio Roi between the flow rate of the fuel flowed out from the common rail 61 based on the target amount of injection Qi through the injectors 62 and the target discharge flow rate FRt. Furthermore, the discharge flow rate calculation unit 122 calculates a balanced discharge flow rate FRb, based on the ratio Roi between the flow rate of the fuel flowed out and the target discharge flow rate FRt.

With the aforementioned structure, the discharge flow rate calculation unit 122 can output the balanced discharge flow rate FRb obtained by increasing or decreasing the target discharge flow rate FRt in the high-pressure fuel pump 5 according to the increase or decrease of the flow rate of the fuel flowed out from the common rail 61 due to the increase or decrease of the target amount of injection Qi through the injectors 62. Therefore, with the control device 100 for the internal combustion engine according to the present embodiment, it is possible to suppress an overshoot of the fuel pressure Pf in the common rail 61 with respect to the target pressure Pt, thereby improving the air exhaust performance and the fuel consumption performance of the engine 2.

Further, in the control device 100 for the internal combustion engine according to the present embodiment, the discharge flow rate calculation unit 122 may calculate the amount of the fuel injected through the injectors 62, using the fuel pressure Pf, and the valve opening time period based on the driving voltage DVi for the injectors 62 illustrated in FIG. 2, for example. In this case, the discharge flow rate calculation unit 122 calculates the flow rate of the fuel flowed out from the common rail 61 using the calculated amount of the fuel injected therethrough.

With this structure, the discharge flow rate calculation unit 122 can output the balanced discharge flow rate FRb obtained by increasing or decreasing the target discharge flow rate FRt in the high-pressure fuel pump 5 according to the increase or decrease of the flow rate of the fuel flowed out from the common rail 61. Therefore, with the control device 100 for the internal combustion engine according to the present embodiment, it is possible to suppress an overshoot of the fuel pressure Pf in the common rail 61 with respect to the target pressure Pt, thereby improving the air exhaust performance and the fuel consumption performance of the engine 2.

Further, in the control device 100 for the internal combustion engine according to the present embodiment, the discharge flow rate restricting unit 123 predicts an occurrence of such an overshoot as to cause the fuel pressure Pf in the common rail 61 to exceed the target pressure Pt, based on the amount of change of the pressure deviation ΔP, as illustrated in the upper right graph in FIG. 6. Further, if the discharge flow rate restricting unit 123 predicts an occurrence of an overshoot, the discharge flow rate restricting unit 123 outputs a restricted discharge flow rate FRr which is smaller than the target discharge flow rate FRt and can suppress an overshoot, as indicated by the arrow A1 in the lower right graph in FIG. 6. Furthermore, the discharge flow rate restricting unit 123 makes the restricted discharge flow rate FRr closer to the target discharge flow rate FRt, as indicated by the arrow A2 in the lower right graph in FIG. 6, according to the decrease of the pressure deviation ΔP.

With this structure, the discharge flow rate restricting unit 123 can restrict the restricted discharge flow rate FRr to less than or equal to the balanced discharge flow rate FRb, based on the pressure deviation ΔP between the fuel pressure Pf in the common rail 61 and the target pressure Pt. Therefore, with the control device 100 for the internal combustion engine according to the present embodiment, it is possible to simultaneously realize improvement of the responsiveness and the stability of the transient response of the fuel pressure Pf.

Further, in the control device 100 for the internal combustion engine according to the present embodiment, the discharge flow rate calculation unit 122 calculates the flow rate of the fuel flowed out from the common rail 61, based on the target amount of injection Qi through the injectors 62, which is calculated based on operating states of the engine 2 as the internal combustion engine.

With this structure, the discharge flow rate calculation unit 122 is capable of foreseeing an increase or decrease of the flow rate of the fuel flowed out from the common rail 61 which occurs after the timing of calculation of the target amount of injection Qi. Therefore, with the control device 100 for the internal combustion engine according to the present embodiment, it is possible to suppress an overshoot of the fuel pressure Pf in the common rail 61 with respect to the target pressure Pt, thereby improving the air exhaust performance and the fuel consumption performance of the engine 2.

As described above, according to the present embodiment, it is possible to provide the control device 100 for the internal combustion engine which is capable of suppressing an overshoot of the fuel pressure Pf in the common rail 61 with respect to the target pressure Pt, thereby improving the air exhaust performance and the fuel consumption performance of the engine 2. Incidentally, the control device for the internal combustion engine according to the present disclosure is not limited to the control device 100 for the internal combustion engine according to the aforementioned embodiment.

Figure 7:
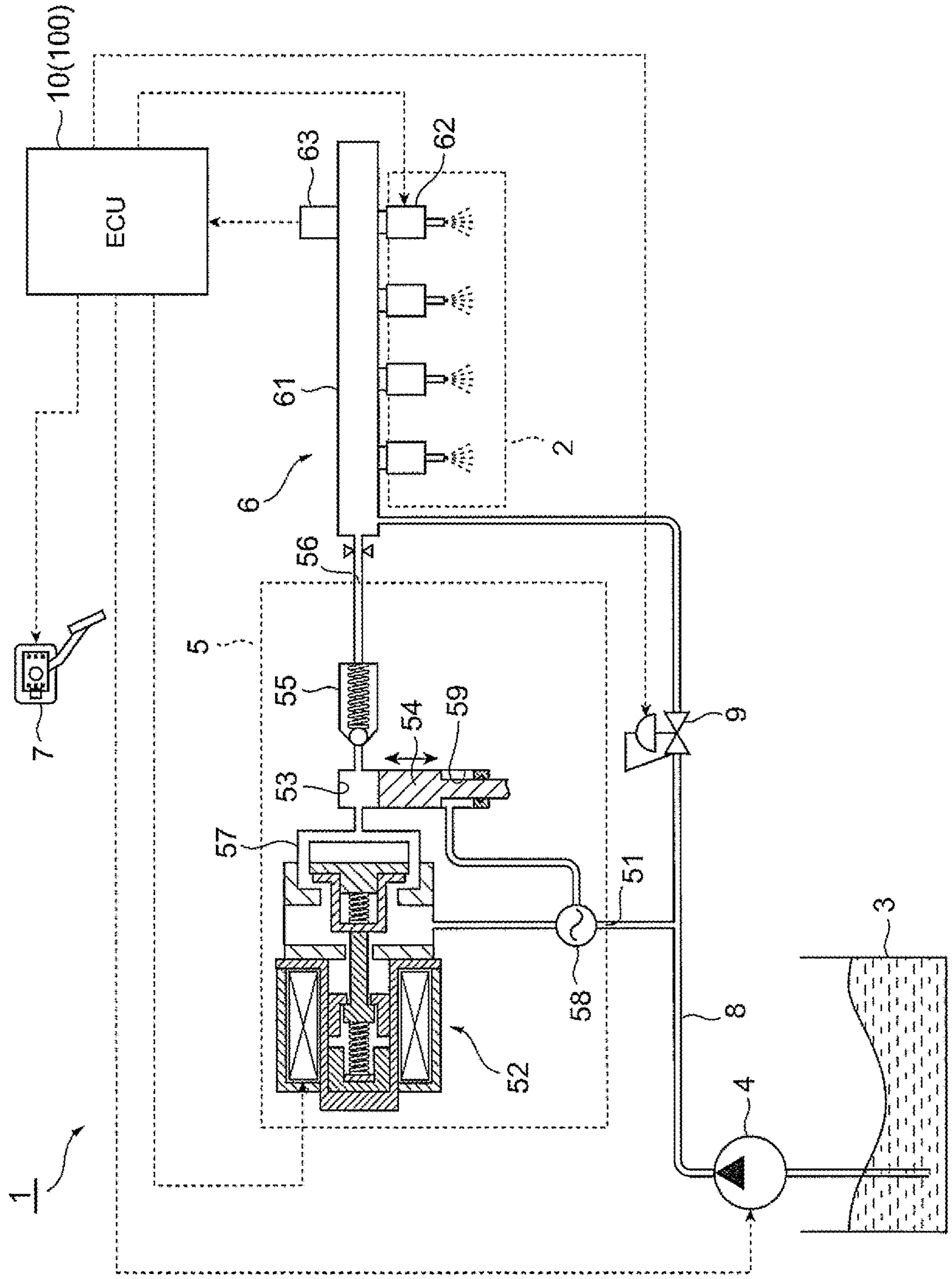
FIG. 7 is a block diagram illustrating an example of modification of the control device for the internal combustion engine according to the present disclosure.

FIG. 7 is a block diagram of an engine system 1 illustrating an example of modification of the control device 100 for the internal combustion engine according to the present embodiment. In the example of modification illustrated in FIG. 7, the engine system 1 includes a pressure regulator 9, wherein, if the fuel pressure Pf in the common rail 61 exceeds a predetermined threshold value, the pressure regulator 9 is opened under the control of the ECU10, thereby releasing the fuel from the common rail 61 to the fuel tank 3.

The control device 100 for the internal combustion engine according to the present example of modification is different from the control device 100 for the internal combustion engine according to the aforementioned embodiment, in the operation of the discharge flow rate calculation unit 122. As described above, the pressure regulator 9 releases the fuel from the common rail 61, if the fuel pressure Pf exceeds the predetermined pressure. The discharge flow rate calculation unit 122 in the present example of modification calculates a balanced discharge flow rate FRb, so as to balance the flow rate of the fuel flowed out through the injection of the fuel through injectors 62, the target discharge flow rate FRt in the high-pressure fuel pump 5, and the flow rate of the fuel released through the pressure regulator 9 with each other.

With this structure, the discharge flow rate calculation unit 122 in the present example of modification can calculate the balanced discharge flow rate FRb, in consideration of the flow rate of the fuel released from the common rail 61 through the pressure regulator 9. Therefore, with the control device 100 for the internal combustion engine according to the present example of modification, even in the case where the engine system 1 includes the pressure regulator 9, it is possible to suppress an overshoot of the fuel pressure Pf in the common rail 61 with respect to the target pressure Pt, thereby improving the air exhaust performance and the fuel consumption performance of the engine 2.

Although the preferred embodiment of the control device for the internal combustion engine according to the present disclosure has been described above, the present disclosure is not limited to the aforementioned embodiment and the example of modification thereof, and addition, omission, substitution, and other changes of structures can be made without departing from the gist of the present disclosure.

REFERENCE SIGNS LIST

5 high-pressure fuel pump
52 electromagnetic valve
53 pressurizing chamber
54 plunger
57 fuel supply path
61 common rail
62 injector
9 pressure regulator
100 control device for internal combustion engine
110 amount-of-injection control unit
120 pressure control unit
121 feedback control unit
122 discharge flow rate calculation unit
123 discharge flow rate restricting unit
124 energization start angle calculation unit
DVi driving voltage
ES rotating speed (operating state of internal combustion engine)
FR discharge flow rate
FRb balanced discharge flow rate
FRr restricted discharge flow rate
FRt target discharge flow rate
IA amount of sucked air (operating state of internal combustion engine)
Pf fuel pressure (operating state of internal combustion engine)
Pt target pressure
Qi target amount of injection
Roi ratio
ΔFR flow-in and flow-out flow rate difference
ΔP pressure deviation
θes energization start angle (phase angle)

The invention claimed is:

1. A control device configured to control a high-pressure fuel pump and an injector of an internal combustion engine, the high-pressure fuel pump including a pressurizing chamber, an electromagnetic valve adapted to open a fuel supply path to the pressurizing chamber when being energized, and a plunger adapted to perform reciprocating motion for introducing the fuel into the pressurizing chamber through the electromagnetic valve and pressurizing the fuel, the control device comprising:

an amount-of-injection control device configured to control an amount of the fuel injected through an injector to a target amount of injection; and a pressure control device configured to control a discharge flow rate of the fuel discharged from the high-pressure fuel pump for controlling a fuel pressure in the common rail to a target pressure, wherein the pressure control device includes a feedback control device configured to calculate a target discharge flow rate of the fuel discharged from the high-pressure fuel pump to the common rail, based on a pressure deviation between the fuel pressure and the target pressure, a discharge flow rate calculation device configured to calculate a balanced discharge flow rate by increasing or decreasing the target discharge flow rate such that the target discharge flow rate of the fuel to the common rail is balanced with the flow rate of the fuel flowed out from the common rail by being injected through the injector, a discharge flow rate restricting device configured to output a restricted discharge flow rate having an upper limit corresponding to the balanced discharge flow rate, based on the pressure deviation, an energization start angle calculation device configured to calculate a phase angle of the reciprocating motion of the plunger at start of energization of the electromagnetic valve in the high-pressure fuel pump, based on the restricted discharge flow rate, and a high-pressure fuel pump control device configured to control a drive pulse that drives the electromagnetic valve of the high-pressure fuel pump based on the energization start angle and the phase angle of the plunger.

2. The control device for the internal combustion engine according to claim 1, wherein the discharge flow rate calculation device is configured to calculate the balanced discharge flow rate by adding a flow-in and flow-out flow rate difference to the target discharge flow rate, wherein the flow-in and flow-out flow rate difference is obtained by subtracting the target discharge flow rate from the flow rate of the fuel flowed out.

3. The control device for the internal combustion engine according to claim 1, wherein the discharge flow rate calculation device is configured to calculate the balanced discharge flow rate, based on a ratio between the flow rate of the fuel flowed out and the target discharge flow rate.

4. The control device for the internal combustion engine according to claim 1, wherein the discharge flow rate calculation device is configured to calculate the amount of the fuel injected through the injector using the fuel pressure, and a valve opening time period based on a voltage for driving the injector, and the discharge flow rate calculation device is configured to calculate the flow rate of the fuel flowed out, using the calculated amount of the fuel injected.

5. The control device for the internal combustion engine according to claim 1, wherein, when the discharge flow rate restricting device predicts an occurrence of an overshoot which causes the fuel pressure to exceed the target pressure, based on an amount of change of the pressure deviation, the discharge flow rate restricting device is configured to calculate the restricted discharge flow rate that is smaller than the target discharge flow rate and can suppress the overshoot, and the discharge flow rate restricting device is configured to calculate the restricted discharge flow rate closer to the target discharge flow rate according to a decrease of the pressure deviation.

6. The control device for the internal combustion engine according to claim 1, wherein the discharge flow rate calculation device is configured to calculate the flow rate of the fuel flowed out, based on the target amount of injection through the injector, which is calculated based on an operating state of the internal combustion engine.

7. The control device for the internal combustion engine according to claim 1, wherein the discharge flow rate calculation device is configured to calculate the balanced discharge flow rate such that the target discharge flow rate, the flow rate of the fuel flowed out, and a flow rate of the fuel released through a pressure regulator are balanced with each other, wherein the pressure regulator releases the fuel from the common rail when the fuel pressure exceeds a predetermined pressure.

* * * * *